(12) United States Patent
Stewart

(10) Patent No.: US 12,730,240 B2
(45) Date of Patent: Sep. 8, 2026

(54) STRUCTURAL TREND PREDICTOR FOR 2D CROSS SECTIONS

(71) Applicant: Saudi Arabian Oil Company, Dhahran (SA)

(72) Inventor: Simon A. Stewart, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 401 days.

(21) Appl. No.: 18/296,006

(22) Filed: Apr. 5, 2023

(65) Prior Publication Data

US 2024/0337766 A1 Oct. 10, 2024

(51) Int. Cl.
*G01V 1/30* (2006.01)
*G01V 1/34* (2006.01)

(52) U.S. Cl.
CPC .............. *G01V 1/301* (2013.01); *G01V 1/345* (2013.01)

(58) Field of Classification Search
CPC ... G01V 1/301; G01V 1/345; G01V 2210/642
See application file for complete search history.

(56) References Cited

U.S. PATENT DOCUMENTS 4,357,660 A * 11/1982 Hepp .................... E21B 47/026 702/10
6,711,293 B1 3/2004 Lowe
6,757,614 B2 6/2004 Pepper et al.
8,725,477 B2 5/2014 Zhang et al.
9,005,983 B2 4/2015 McGuinness et al.
10,990,882 B2 4/2021 Borrel et al.
2011/0118985 A1* 5/2011 Aarre ..................... G01V 1/301 702/16
2014/0118350 A1 5/2014 Imhof et al.
(Continued)

FOREIGN PATENT DOCUMENTS

WO WO 1999/064896 12/1999

OTHER PUBLICATIONS

Stewart, Interpretation validation on vertically exaggerated reflection seismic sections, Elsevier, 2012 (Year: 2012).*
(Continued)

*Primary Examiner* — Kyle R Quigley
(74) *Attorney, Agent, or Firm* — Fish & Richardson P.C.

(57) ABSTRACT

Systems and methods include a computer-implemented method for identifying geological structural trends. A cross section with visible geological fault markers for geological structures is received. An angle of inclination of a fault is measured. An average seismic velocity to convert z-axis values from a two-way travel time to a depth is determined. A depth conversion is implemented. A horizontal scale and a vertical scale are compared to determine an aspect ratio of a depth section of the cross section, including determining a vertical exaggeration. The aspect ratio of the depth section is corrected for the vertical exaggeration to obtain an accurate measurement of fault inclination in the cross section. A structural style and an expected true fault inclination are determined for the depth section. An angle of obliquity and a structural trend are determined using the expected true fault inclination compared with the measured angle of inclination of the fault.

20 Claims, 6 Drawing Sheets

(56) References Cited

U.S. PATENT DOCUMENTS

| | | | | |
|---|---|---|---|---|
| 2014/0185413 | A1* | 7/2014 | Aarre | G01V 1/301 367/53 |
| 2015/0073715 | A1* | 3/2015 | Aarre | G01V 1/345 702/14 |
| 2015/0134255 | A1* | 5/2015 | Zhang | G01V 1/40 702/14 |
| 2020/0158898 | A1* | 5/2020 | Le Guern | G01V 1/345 |
| 2021/0247534 | A1* | 8/2021 | Bø | G01V 1/302 |

OTHER PUBLICATIONS

Alcalde et al., Fault interpretation in seismic reflection data an experiment analysing the impact of conceptual model anchoring and vertical exaggeration, Solid Earth, 2019 (Year: 2019).*

Kai et al., Research and application of a new seismic data conversion method based on radian operation, Society of Exploration Geophysicists, 2021 (Year: 2021).*

Zongjie, Fault recognition in a fractured-vuggy reservoir, Society of Exploration Geophysicists, 2021 (Year: 2021).*

Zuo et al., A new method of fault identification based on stratigraphic inclination coherence analysis in high steep formation area, Society of Exploration Geophysicists, 2020 (Year: 2020).*

Analysis of geological structures, 1st ed., Cambridge University Press, Aug. 1990, pp. 127 and 128.

Anderson "The dynamics of faulting," Transactions of the Edinburgh Geological Society, Mar. 1905, 8(3):387-402, 16 pages.

Balanced Geological Cross-sections: An essential technique in geological research and exploration, vol. 6, Crawford and Padovani (eds)., Jan. 1989, 139 pages.

Boyer et al. "Thrust Systems," AAPG Bulletin, Sep. 1982, 66(9): 1196-1230, 36 pages.

Catuneanu, "Model-independent sequence stratigraphy, Earth-Science Reviews," Jan. 2019, 188:312-388, 77 pages.

Confalonieri et al., "A historical perspective of explainable Artificial Intelligence," WIREs Data Mining and Knowledge Discovery, Oct. 2020, 11(1), 21 pages.

Fernandez et al. "Quantifying and correcting errors derived from apparent dip in the construction of dip-domain cross-sections," Journal of Structural Geology, Jan. 2003, 25(11):35-42, 8 pages.

Groshong "3-D Structural Geology: A practical guide to quantitative surface and subsurface map interpretation," Geology, Second Edition, Springer-Verlag, Berlin, Jan. 2006, pp. 49-53, 5 pages.

Gunderson et al., "Machine learning applications to seismic structural interpretation: Philosophy, progress, pitfalls, and potential," 2021, AAPG Bulletin, 106:11, 2187-2202, 16 pages.

Healy et al., "Stress, faulting, fracturing and seismicity: the legacy of Ernest Masson Anderson," Geological Society, 367(1):6 pages.

Hubbert "Graphic Solution of Strike and Dip from Two Angular Components," AAPG Bulletin, Jan. 1931, 283-286, 4 pages.

Judge et al., "Assessing uncertainties in balanced cross sections," Journal of Structural Geology, Apr. 2011, 33(4):458-467, 10 pages.

McClay et al., "4-D Evolution of Rift Systems: Insights from Scaled Physical Models," AAPG Bulletin, Jun. 2002, 86(6):935-959, 25 pages.

Mitchum et al., "Seismic stratigraphy and global changes of sea level, part 2: the depositional sequence as a basic unit for stratigraphic analysis," AAPG Memoir, 1977, 26:53-62, 10 pages.

Mitchum, et al., "Seismic stratigraphy and global changes of sea level, part 6: stratigraphic interpretation of seismic reflection patterns in depositional sequences," AAPG Memoir, 1977, 26:117-133, 17 pages.

Roberto et at., "Modeling and reasoning techniques in geologic interpretation," IEEE Transactions on Systems, Man, and Cybernetics—Part A: Systems and Humans, Sep. 1999, 29(5):460-473, 14 pages.

Stewart et al., "Salt tectonics in the North Sea Basin: a structural style template for seismic interpreters," Deformation of the Continental Crust: The Legacy of Mike Coward. Geological Society, London, Special Publications, Feb. 2007, 272:361-396, 36 pages.

Stewart, "Vertical exaggeration of reflection seismic data in geoscience publications 2006-2010," Marine and Petroleum Geology, May 2011, 28(5):959-965, 7 pages.

Van Hoek et al., "Geometric attributes for seismic stratigraphic interpretation," The Leading Edge, Sep. 2010, 1056-1065, 8 pages.

Vilone et al., "Notions of explainability and evaluation approaches for explainable artificial intelligence," Information Fusion, May 2021, 76, 89-106, 18 pages.

Williams, Tectonics and seismic sequence stratigraphy: an introduction, Tectonics and Seismic Sequence Stratigraphy, 1993, 71:13 pages.

Xia et al., "Geometric Primitives in LiDAR Point Clouds: A Review," IEEE Journal of Selected Topics in Applied Earth Observations and Remote Sensing, 2020 13, 687-707, 24 pages.

Xu et al., "Seismic facies analysis: Past, present and future," Earth-Science Reviews, 224:103876, 30 pages.

* cited by examiner

STRUCTURAL TREND PREDICTOR FOR 2D CROSS SECTIONS

TECHNICAL FIELD

The present disclosure applies to mapping subsurface structures.

BACKGROUND

Structural trends are key to understanding the distribution of subsurface resources such as hydrocarbons, minerals, water, and so on. In well-explored areas with high data density that might include three-dimensional (3D) reflection seismic and/or many drilled wells, orientation of structural trends can typically be determined with minimal doubt and error. In this case, subsurface maps will generally be quite accurate. On the other hand, remote (e.g., "frontier") areas may tend to have limited subsurface data. In such cases, there are few or no drilled wells, while reflection seismic is likely to consist of widely-spaced 2D lines of section. In the remotest basins, a two-dimensional (2D) seismic grid may have a line spacing of tens or hundreds of kilometers. In sparse data situations such as these, structural features that are recognized in a given line of section may not be easily connectable by interpolation to any other points of subsurface information such as wells or other cross sections. As such, their trend may therefore be unknown.

The next steps in exploration programs in such cases typically include an initial assessment of the subsurface potential for the resource under investigation. This is typically followed by a layout of further data acquisition to constrain the subsurface structural geometry in order to enable a more accurate determination of likely subsurface resource volumes to support project and major investment decision-making. If structure trends are unknown at the outset, much uncertainty is introduced into initial resource estimates. Unnecessary expenditure may then be introduced into delineation programs that are laid out with no knowledge of the structural trends.

The trend of geological structures is clearly constrained when spatially-dense subsurface data is available, such as 3D reflection seismic data. However, in other cases, subsurface data may be sparse and, as a result, the trend of geological structures is not clearly constrained. The sparse data may include, for instance, widely-spaced 2D reflection seismic lines with few drilled deep wells. In this case, the trend of geological structures such as folds and faults cannot be determined from individual 2D cross sections because the intersection angle between the geological structure trend and the orientation of the cross-section is unknown. Knowledge of structural trends is desirable in geological mapping to determine the continuity of associated phenomena such as mineral or fluid resources.

SUMMARY

The present disclosure describes techniques that can be used for identifying geological structural trends from a single cross section. The techniques can be used, for example, for mapping subsurface structures for the purposes of establishing a general geological trend in frontier exploration areas. The techniques can also be used in other situations where available data is limited to a small number of reflection seismic lines, as a basis for more detailed seismic mapping or exploration activity.

In some implementations, a computer-implemented method includes the following. A cross section with visible geological fault markers for geological structures is received. An angle of inclination of a fault is measured using the cross section. An average seismic velocity to convert z-axis values from a two-way travel time to a depth is determined using the cross section, and a depth conversion is implemented. A horizontal scale and a vertical scale are compared to determine an aspect ratio of a depth section of the cross section, including determining a vertical exaggeration. The aspect ratio of the depth section is corrected for the vertical exaggeration to obtain an accurate measurement of fault inclination in the cross section. A structural style and an expected true fault inclination are determined for the depth section. An angle of obliquity and a structural trend are determined using the expected true fault inclination compared with the measured angle of inclination of the fault.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. The techniques can be used to solve the technical problem of how to estimate the likely structural trend from a single cross section. The structural style recognized in the single available cross section can be used to define the reference geometry of the observed structures, particularly fault dips. The term structural style refers to geological structures of specific geometry that characterize specific geological deformation types, including but not limited to extension or compression. Structural styles may include folds of the geological strata and breaks in the strata that are termed geological faults. Comparison of observed fault dips, after appropriate preprocessing steps outlined in the present disclosure (with theoretical true dips), can yield the angle of obliquity between the two. This can significantly reduce uncertainty of the orientation of the structural trend. Current technologies are not known for tackling the problem of determining structural trends from oblique cross sections alone. The present disclosure, however, combines elements from several disjoint disciplines (e.g., seismic interpretation, exploration geophysics, and structural geology) that individual subject matter experts in such disciplines would not find obvious to combine in their entirety. The principal advantages include rapid reduction in the uncertainty on structural trends narrowing the map-view corridors that may contain features of interest such as hydrocarbon or mineral trends, enabling targeted further data acquisition with reduced cost.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

Figure 1:
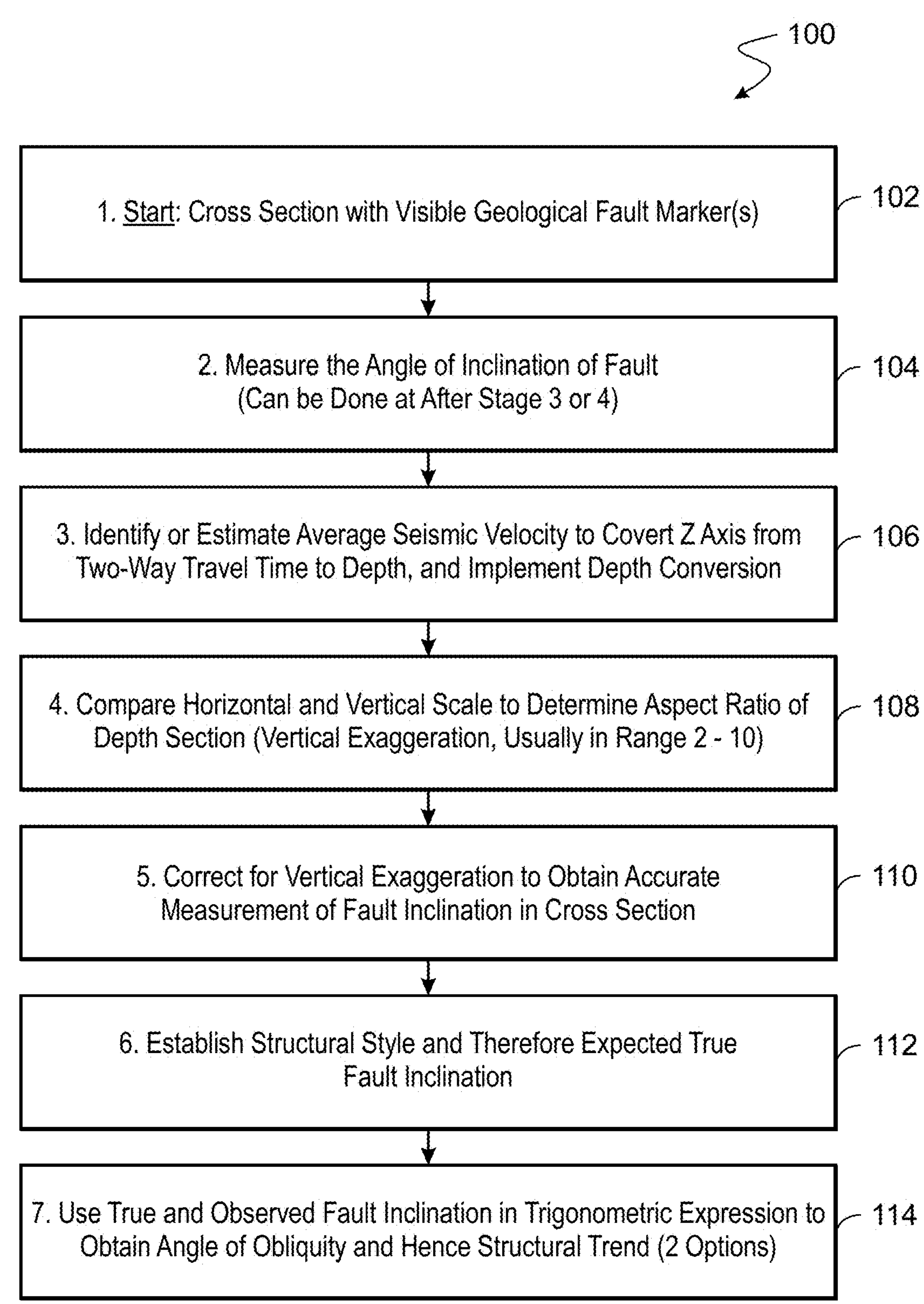
FIG. 1 is a flow diagram showing an example of a workflow for determining an angle of obliquity between the observed structure in a single line of cross section and the actual trend of the structure, according to some implementations of the present disclosure.

The following detailed description describes techniques for identifying geological structural trends from a single cross section. For example, the techniques can be used in subsurface mapping during exploration, such as for potential well locations or further reflection seismic data to delineate structural trends. Various modifications, alterations, and permutations of the disclosed implementations can be made and will be readily apparent to those of ordinary skill in the art, and the general principles defined may be applied to other implementations and applications, without departing from the scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Techniques of the present disclosure provide a partial solution to the problem of obtaining knowledge of structural trend, reducing the uncertainty of structural trend from being completely unknown to two possible trends. The narrowed set of options for determining structural trend can be targeted by subsequent data acquisition, e.g., using additional 2D reflection seismic lines and/or using gravity and magnetic surveys, or drilling wells. The techniques of the present disclosure specifically make use of known dip (inclination) angles of fundamental geological structures such as faults. These are well-constrained by the industry into groups of approximately 30°, approximately 60°, and sub-vertical, depending on the specific style of the geological structure(s). Well-known geometrical relationships between true and apparent dip can be used to determine how these angles vary in cross sections, according to angles of intersection between the lines of cross section and the direction of the maximum dip of the geological structure. This angle of intersection can be used to determine the geological trend with two options, since the angle can be positive or negative with respect to the line of cross section.

The techniques of the present disclosure can be associated with a workflow (e.g., workflow 100 of FIG. 1) based on the geometrical relationship between true and apparent dip, combined with the theoretical true dip of structures of a given structural style, to determine the angle of trend intersection. The workflow 100 can be supported by relatively simple charts or applications (apps) that can allow geoscientists to utilize observed structural dips on cross sections, combined with structural style and other parameters such as depth conversion, to estimate the structural trend. The techniques of the present disclosure can be applied in frontier exploration situations such as hydrocarbon or mineral exploration in remote basins.

In current systems, the angular relationship between true and apparent dip may typically be well-known, as are the true dips of structures in specific geological styles such as extension, compression, and strike slip. However, these features have not been combined in current systems in relation to the evaluation of structural trends from 2D reflection seismic cross sections. This is because additional steps in corresponding workflows need to be overcome in the implementation, specifically coping with depth conversion and inherent vertical exaggeration of reflection seismic, both of which distort angular relationships. A method is described in the present disclosure that deals with each of these issues in turn, accruing quantified uncertainties where parameters such as seismic velocity are unknown, in order to implement the linkage of theoretical true dips with observed, apparent dips to deduce structural trends.

FIG. 1 is a flow diagram showing an example of a workflow 100 for determining an angle of obliquity between observed structure in a single line of cross section and the actual trend of the structure, according to some implementations of the present disclosure. At 102, a cross section is selected that has geological structure that can be identified and interpreted with some degree of confidence. In this example, the cross section can typically be a 2D reflection seismic line, but can also be a potentiometric field profile or seismic refraction line. At 104, an angle of inclination of fault is measured, though this measurement can occur later in the workflow 100. At 106, an average seismic velocity is identified (or estimated) to convert a z-axis from a two-way travel time to a depth, a standard procedure known as depth conversion. At 108, horizontal and vertical scales are compared to determine an aspect ratio of depth section (e.g., a vertical exaggeration, usually in a range of 2-10, for example, where a vertical exaggeration of 2, for example, means that the length of given units on the vertical axis is greater than equivalent units on the horizontal axis by a factor of 2. This is also known as the aspect ratio). After depth conversion, which renders the horizontal and vertical axes in the same units of length, the vertical exaggeration is apparent by comparing the length of a unit on the horizontal with an equivalent unit (for example, one kilometer) on the vertical axis. At 110, a correction for vertical exaggeration is made to obtain an accurate measurement of fault inclination in the cross section. At 112, a structural style is established, by visual identification by someone of regular skill in the art and therefore, expected true fault inclination. At 114, true and observed fault inclination is used in a function (e.g., trigonometric expression) to obtain an angle of obliquity and hence structural trend.

Figure 2A:
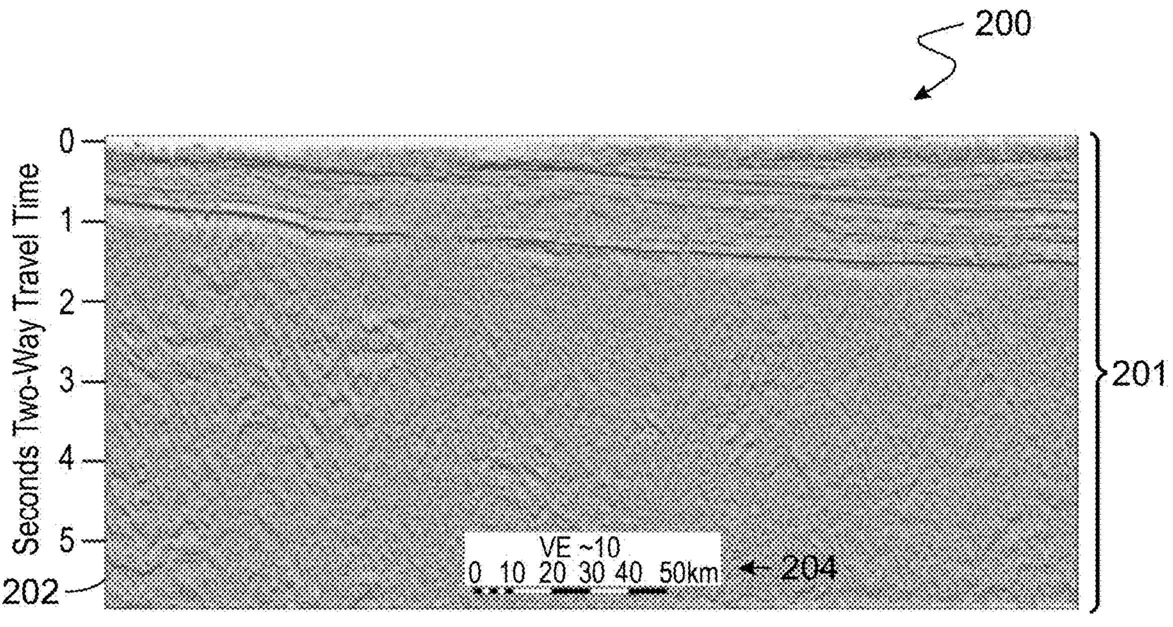
FIG. 2A is a drawing showing an example of a single seismic line determined from un-interpreted data, according to some implementations of the present disclosure.

FIG. 2A is a drawing 200 showing an example of a single seismic line 201 consisting of un-interpreted data acquired in the field and processed according to established reflection seismic processing techniques that lead to an interpretable cross section display as shown here, according to some implementations of the present disclosure. The seismic processing workflows typically lead to uninterpreted data displayed with the vertical scale in two-way time. In this example, seismic lines in the drawing are relative to a horizontal scale bar 204 (e.g., with a scale of 50 km) and vertical scale bar 202 (e.g., in seconds, representing a two-way travel time).

Figure 2B:
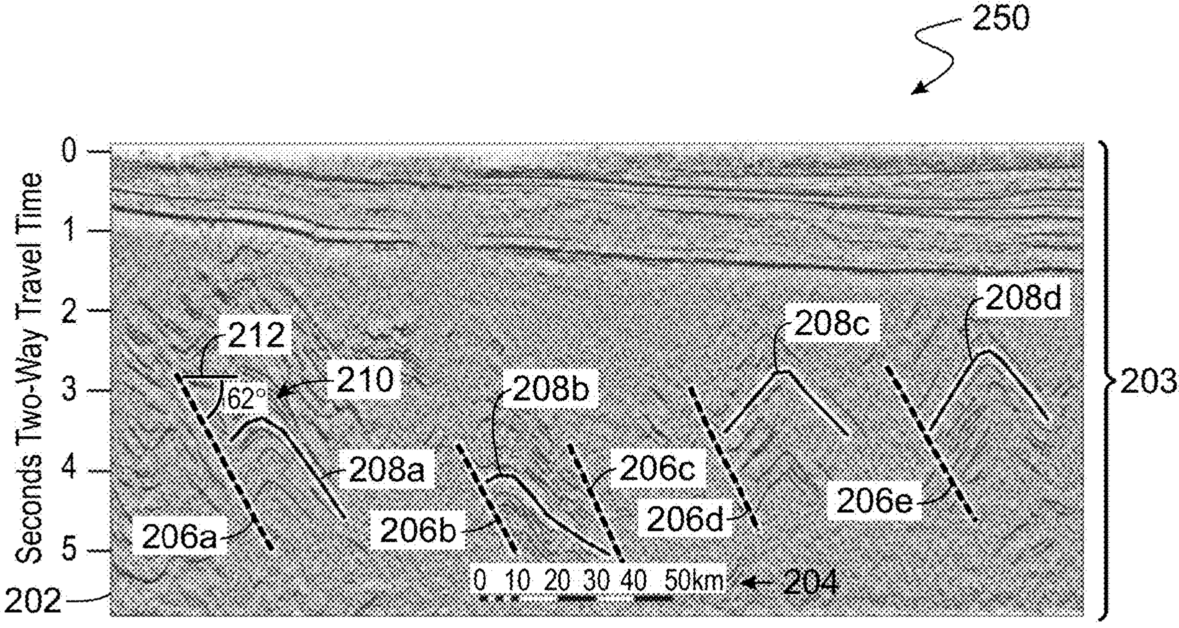
FIG. 2B is a drawing showing an example of reflection seismic lines determined from interpretation showing compressional structural style with folded layers and faults, according to some implementations of the present disclosure.

FIG. 2B is a drawing 250 showing an example of reflection seismic line 203 with superimposed interpretation showing compressional structural style with folded layers and faults, according to some implementations of the present disclosure. Folded layers defined by the reflection seismic lines 203 are outlined using solid lines 208*a*-208*d*, and the faults are outlined using dashed lines 206*a*-206*e*.

A typical example of a 2D seismic reflection line with interpretable faults is shown in FIG. 2B. Dashed lines 206*a*-206*e* represent faults in this line of section with the vertical scale and aspect ratio as presented have an inclination angle 210 of approximately 62° (step 104) relative to horizontal 212. The terms "dip" and "inclination" can be used interchangeably to refer to the inclination of a linear element in a cross section, if that element is neither horizontal nor vertical. Reflection seismic data, especially individual, 2D sections in remote areas, tend to be displayed with the vertical axis being in units corresponding to the seismic acquisition method, namely two-way sonic travel time. Therefore, in order to establish the actual inclination of subsurface structures, the vertical axis must be converted from two-way travel time to depth, using the well-known relationship between distance, velocity, and time, in Equation (1):

$$d = vt/2 \quad (1)$$

In Equation (1), d is distance (or depth), vis sonic velocity, and t is time. A factor of 2 is included in the implementation of this function in depth conversion since reflection seismic data is recorded and displayed in units of two-way travel time. This is a standard procedure in the production of subsurface maps, which generally rely on reflection seismic data. Reference seismic velocities are listed by rock type in Table 1.

Table 1 lists typical seismic (sonic) velocities in different rock types, used for depth converting reflection seismic data from two-way travel time to depth on the vertical axis.

TABLE 1

Typical Seismic Velocities in Different Rock Types

| | Velocity, meters/second (m/s) | |
|---|---|---|
| | Minimum | Maximum |
| Water | 1500 | 1550 |
| Poorly compacted siliciclastics | 1550 | 3000 |
| Sandstones and shales | 3000 | 5000 |
| Carbonates | 3000 | 6000 |
| Evaporites | 4000 | 6000 |
| Salt (halite) | 4500 | 4600 |
| Intra-basinal igneous (unweathered) | 5000 | 6500 |
| Metamorphics and other basement | 6000 | 8500 |

These velocities are well-known to practitioners in the art of seismic interpretation and subsurface map making. Selection of velocity is according to available well control information. If wells are unavailable, regional knowledge of rock types can be used together with the information in Table 1. If wells are unavailable, velocities obtained during seismic processing, for instances in the processes of stacking and migration, can be used as guidelines for sonic velocities to be used in depth conversion. Any error in assumed average velocity in relation to the true average velocity in the depth conversion process introduces an error in angles of inclination of lines in the cross section (for example, interpreted geological faults) with an inclination greater than zero and less than 90° according to Equation (2), which is graphed in FIG. 3

$$\tan\delta' = (v'/v)\tan\delta \quad (2)$$

Figure 3:
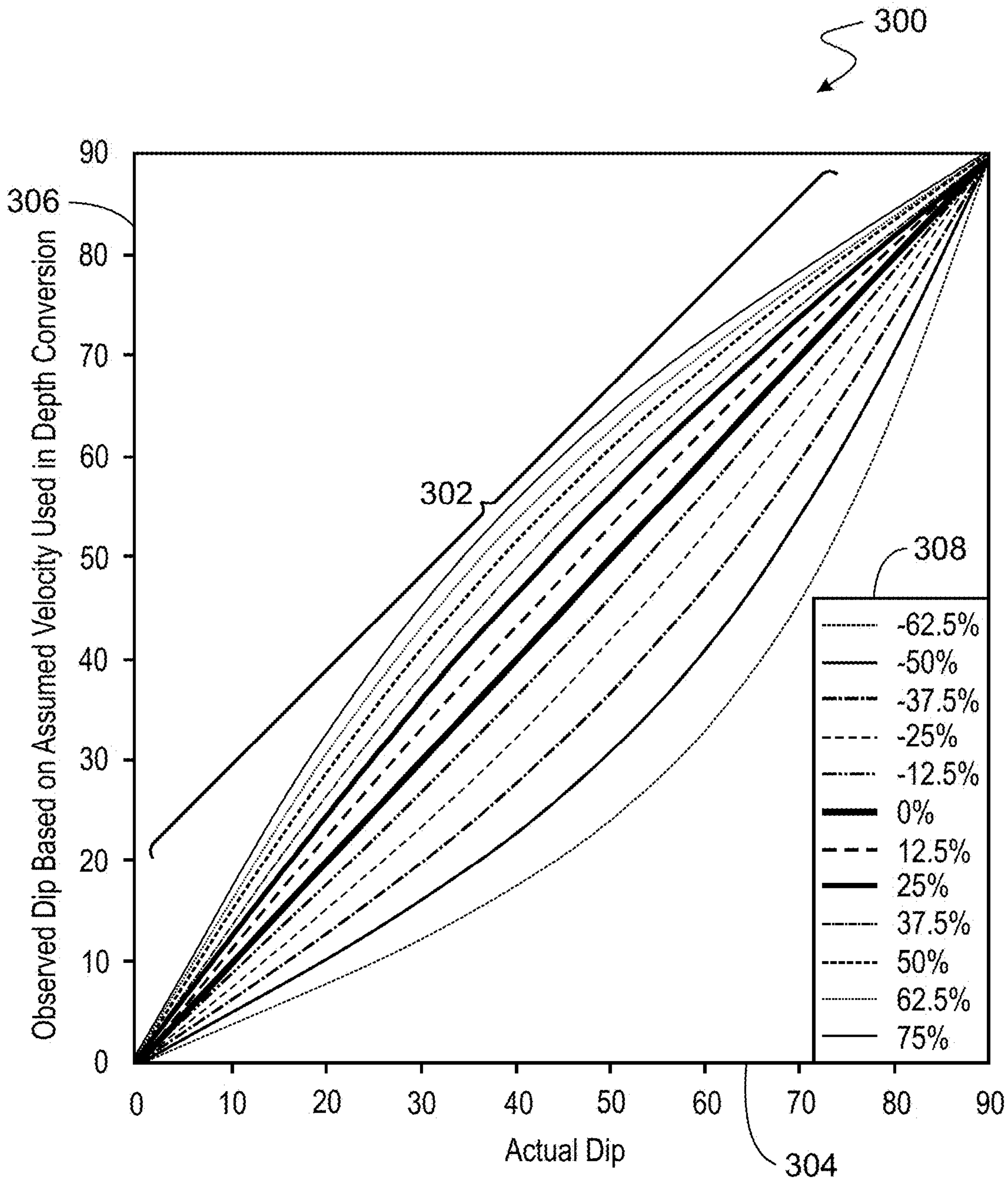
FIG. 3 is a graph showing an example of error in inclination curves, according to some implementations of the present disclosure.

In Equation (2), δ is the inclination of a line if the correct sonic velocity is used, that is, the true inclination of the line that is represented in the cross section at hand. In this equation, v' is the assumed average sonic velocity, v is the actual (i.e., true) average sonic velocity, and δ' is the observed line inclination in the cross section at hand. The error (δ minus δ') is an inherent uncertainty in all depth conversions that rely on estimated sonic velocities and is commonly in the range ±15%. As seen in FIG. 3, this translates into inclination errors in the range ±7°.

In step 108, the aspect ratio of displayed seismic data should be determined since this also distorts the inclination angles of non-vertical linear elements if the aspect ratio is anything other than 1:1. Aspect ratio of reflection seismic data, whether the depth axis is displayed in two-way time or depth, is usually in the range 2-10. This is due to a combination of factors—first, seismic is more densely sampled during the acquisition process in the vertical than horizontal direction so appears stretched laterally when displayed at 1:1 scale. Second, seismic is routinely compressed laterally for the convenience of observing long lengths of section or emphasizing subtle low-relief structures. The impact of vertical exaggeration on inclined lines is described by Equation (3).

$$\tan\delta'' = VE\tan\delta' \quad (3)$$

In Equation (3), δ' is the inclination of a line that would be observed on a 1:1 aspect ratio section, VE is vertical exaggeration, and δ" is the observed inclination on the cross section that is vertically exaggerated. In practice the vertical exaggeration can be measured on depth converted sections with ease by taking the ratio of the vertical and horizontal scales over a constant interval. Translating the observed inclination of a line on a vertically exaggerated section to the equivalent inclination on a 1:1 section can be simply calculated from a rearrangement of Equation (3), resulting in Equation (4) (used in step 110).

$$\delta' = \operatorname{atan}(\tan\delta''/VE) \quad (4)$$

Figure 4:
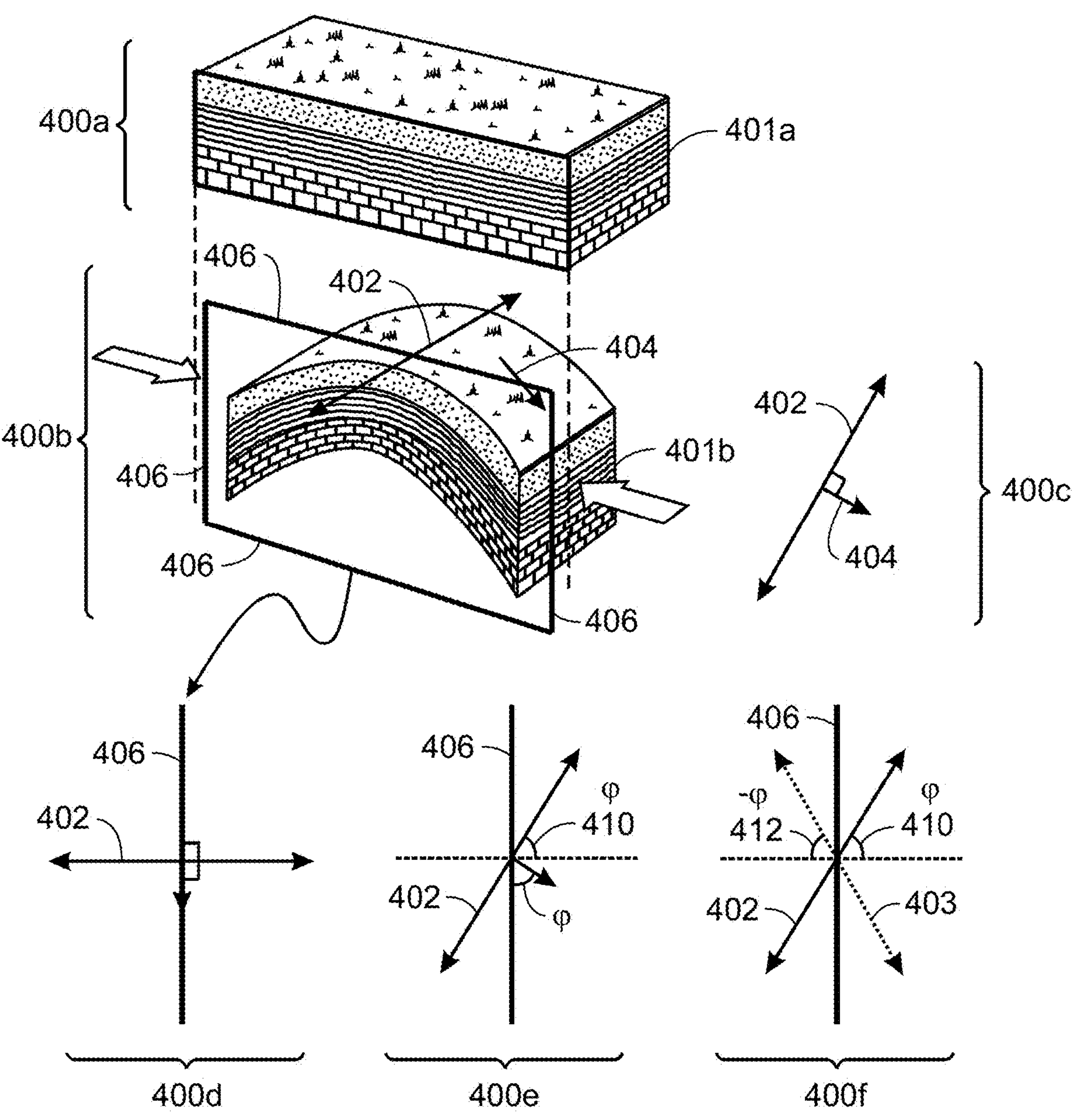
FIG. 4 is a drawing showing an example of a set of projections for a geological fold trend and angle of obliquity to cross section, according to some implementations of the present disclosure.

The examples shown in FIGS. 2A and 2B are from a frontier area with no deep wells and average sonic velocities estimated to be in the range of 4,250 meters/second (m/s) to 5,750 m/s from knowledge of the regional geology. Implementing these velocities to transform FIG. 2A from two-way time in the vertical direction to depth, and correcting for vertical exaggeration, gives observed fault dips (the dashed lines 206*a*-206*e* shown in FIG. 2B) in the range 10°-13.5° in this line of section. In an aspect of the present disclosure, the fault inclination angle thus obtained would be equal to the expected true fault dip angles if the line of cross section had been oriented parallel to the maximum dip direction at right angles to the structural trend (FIG. 4). In step 112 the structural style is established in the subject cross section in order to have a reference true dip or inclination angle. This is an interpretative step that is relatively straightforward to someone well-practiced in the art of reflection seismic interpretation and subsurface mapping. It is well established that compressional faults have true inclination angles close to 30°, extensional faults dip at 60°, and strike-slip faults are sub-vertical. These ideal dips may be affected over geological time by sundry structural geology processes and may become altered from their initial theoretical values, but such modifications would be apparent from the structures observed on the seismic at hand in terms of whether deformation is complex or simple. In the example provided in FIG. 2B, the deformation can be regarded as a compressional style with a low degree of complexity. This interpretation of FIG. 2B could be made by anyone who practices in the art and in this case, there is sufficient signal to noise in the reflection seismic example for confidence to be high in this interpretation. Therefore, true dips of approximately 30° can be expected for the faults identified in FIG. 2B. In step 114, the observed inclination of faults is compared with the theoretical inclination for the observed structural style using the well-known expression for apparent dip, Equation (5).

$$\cos\varphi = \tan\delta'' / \tan\delta_{true} \quad (5)$$

In Equation (5), δ" is the inclination observed in the depth converted cross section at 1:1 aspect ratio, $\delta_{true}$ is the true, maximum angle of dip expected for the structural style as established in step 112 and φ is the horizontal angle between this true dip direction and the line of the cross section in which the apparent dip has been observed and calculated, also referred to here as angle of obliquity. This angle of obliquity is used to determine the structural trend in relation to the trend of the cross section at hand. These angles and relationships are illustrated in FIG. 4. The range of dips established in this example in step 110 (10°-13.5°, combined with expected dip of 30° for the observed structural style, imply an obliquity based on Equation (5) in the range ±(65°-72°) The "±" is because any angle of obliquity greater than zero and less than 90° can have two possible intersections with a given cross section (402 and 403 in FIG. 4F). Although the result is non-unique in that two alternative trends are yielded by the method, this is a significant reduction in the possibilities that a mapper typically initially faces, where the trends are unconstrained and could be in any orientation. The information thus obtained can enable targeted subsequent data acquisition and or focused interpretation efforts interpolating between structures observed on widely-spaced 2D cross sections. This can yield estimates of subsurface structural layout and related resource distribution at an early phase in a project.

FIG. 3 is a graph 300 showing examples of error in inclination curves 302, according to some implementations of the present disclosure. The graph 300 shows an error in inclination (actual dip 304) of linear elements (for example faults) on cross sections if the cross section is transformed in the z-direction from time to depth 306 using an incorrect sonic velocity. The curves 302 represent the amount (defined for different line styles in percentage key 308) by which a chosen sonic velocity is in error in relation to the actual sonic velocity.

FIG. 4 is a drawing showing an example of a set 400 of projections 400*a*-400*f* for a geological fold trend and angle of obliquity to cross section, according to some implementations of the present disclosure. Projection 400*a* shows flat-lying, undeformed geological layers 401*a* with no structural trend. Projection 400*b* shows folded geological layers 401*b* with a fold trend (e.g., along a fold trend axis 402) and a fold limb inclination 404 showing a direction of maximum structural dip or inclination. Lines 406 indicate a vertical plane of cross section parallel to the maximum dip direction. Projection 400*c* shows a map-view of structural trend (fold trend axis 402) and the maximum fold limb dip direction, which is at right-angles to structural trend. Projection 400*d* shows a map view of projection 400*b* where a line of the cross section (lines 406) is parallel to the maximum dip direction and normal to the structural trend. Projection 400*e* shows a map view of a case where a cross section is not parallel to the maximum dip direction, and makes an angle φ 410 with the maximum dip direction when measured in the horizontal plane. An angle φ 410 is also defined here as an angle of obliquity between the cross section and the structural trend and is 90° if the cross section is parallel to the structural trend. Projection 400*f* shows that angle φ 410 is non-unique because, for a given obliquity φ, there exists an angle −φ 412 that effectively intersects the cross section at the same angle but with a different trend 403 and is indistinguishable without further constraints.

Figure 5:
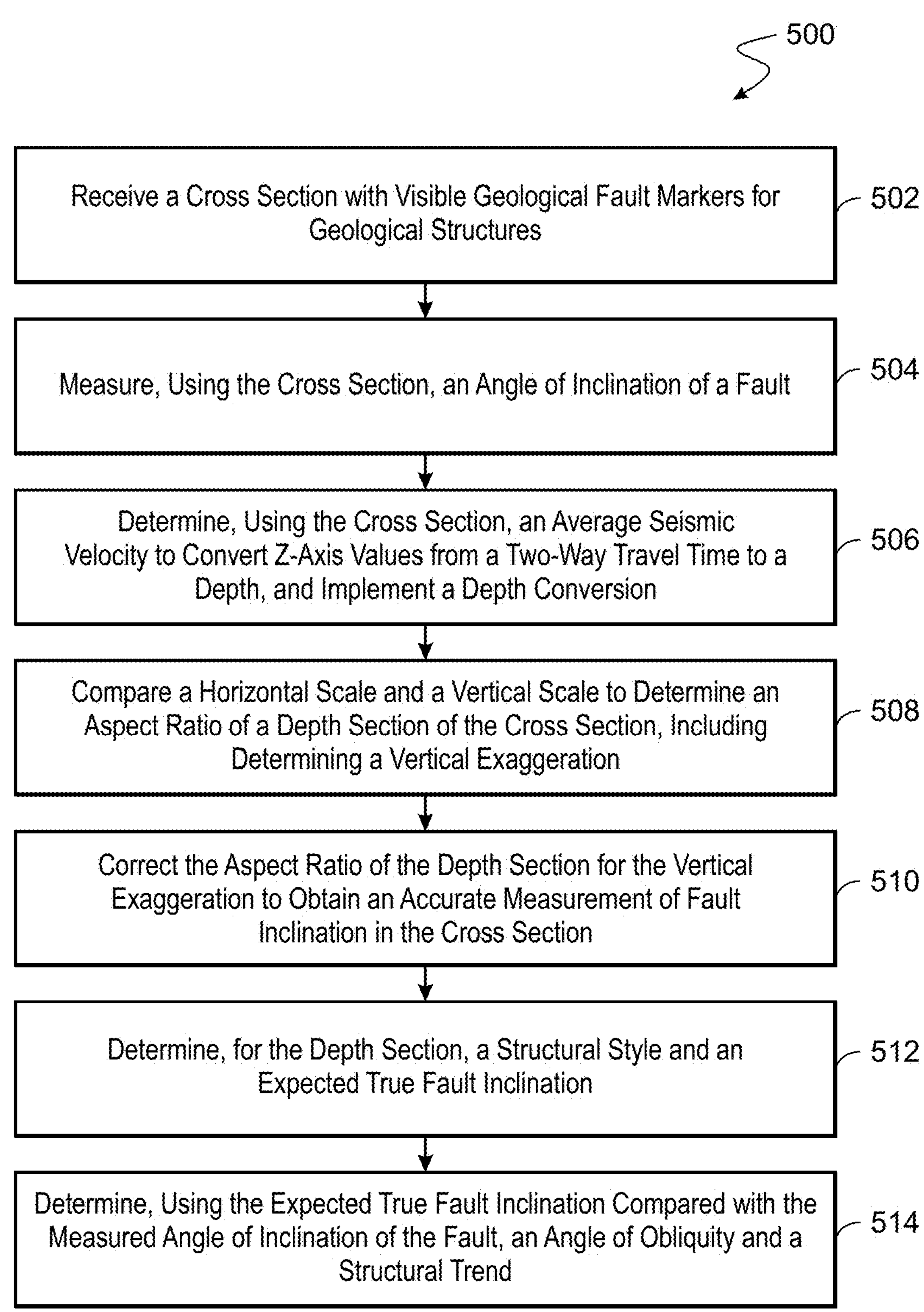
FIG. 5 is a flowchart of an example of a method for determining an angle of obliquity and a structural trend for the well, according to some implementations of the present disclosure.

FIG. 5 is a flowchart of an example of a method 500 for determining an angle of obliquity and a structural trend for the well, according to some implementations of the present disclosure. For clarity of presentation, the description that follows generally describes method 500 in the context of the other figures in this description. However, it will be understood that method 500 can be performed, for example, by any suitable system, environment, software, and hardware, or a combination of systems, environments, software, and hardware, as appropriate. In some implementations, various steps of method 500 can be run in parallel, in combination, in loops, or in any order.

At 502, a cross section with visible geological fault markers for geological structures is received. For example, the cross section can be a two-dimensional (2D) reflection seismic line, or the cross section can be a potentiometric field profile or seismic refraction line. From 502, method 500 proceeds to 504.

At 504, an angle of inclination of a fault is measured using the cross section. From 504, method 500 proceeds to 506.

At 506, an average seismic velocity to convert z-axis values from a two-way travel time to a depth is determined using the cross section, and a depth conversion is implemented. As an example, the average seismic velocity can be determined, at least in part, based on knowledge of rock types and corresponding average seismic velocities. From 506, method 500 proceeds to 508.

At 508, a horizontal scale and a vertical scale are compared to determine an aspect ratio of a depth section of the cross section, including determining a vertical exaggeration. For example, determining the vertical exaggeration is based on an equation tan δ"=VE tan δ' where δ' is the inclination of a line observed on a 1:1 aspect ratio section, VE is a vertical exaggeration, and δ" is the observed inclination on the cross section that is vertically exaggerated. From 508, method 500 proceeds to 510.

At 510, the aspect ratio of the depth section is corrected for the vertical exaggeration to obtain an accurate measurement of fault inclination in the cross section. From 510, method 500 proceeds to 512.

At 512, a structural style and an expected true fault inclination are determined for the depth section. From 512, method 500 proceeds to 514.

At 514, an angle of obliquity and a structural trend are determined using the expected true fault inclination compared with the measured angle of inclination of the fault. As an example, an angle of obliquity greater than zero and less than 90° includes two possible intersections with a given cross section. The angle of obliquity is positive or negative with respect to the line of cross section. After 514, method 500 can stop.

In some implementations, standard petrotechnical software applications can be reconfigured to accommodate the features described in the present disclosure. This can be done by the vendors that own the apps, or can be coded as an add-on to apps if their architecture allows.

In some implementations, in addition to (or in combination with) any previously-described features, techniques of the present disclosure can include the following. Outputs of the techniques of the present disclosure can be performed before, during, or in combination with wellbore operations, such as to provide inputs to change the settings or parameters of equipment used for drilling. Examples of wellbore operations include forming/drilling a wellbore, hydraulic fracturing, and producing through the wellbore, to name a few. The wellbore operations can be triggered or controlled, for example, by outputs of the methods of the present disclosure. In some implementations, customized user interfaces can present intermediate or final results of the above described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or "app"), or at a central processing facility. The presented information can include suggestions, such as suggested changes in parameters or processing inputs, that the user can select to implement improvements in a production environment, such as in the exploration, production, and/or testing of petrochemical processes or facilities. For example, the suggestions can include parameters that, when selected by the user, can cause a change to, or an improvement in, drilling parameters (including drill bit speed and direction) or overall production of a gas or oil well. The suggestions, when implemented by the user, can improve the speed and accuracy of calculations, streamline processes, improve models, and solve problems related to efficiency, performance, safety, reliability, costs, downtime, and the need for human interaction. In some implementations, the suggestions can be implemented in real-time, such as to provide an immediate or near-immediate change in operations or in a model. The term real-time can correspond, for example, to events that occur within a specified period of time, such as within one minute or within one second. Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

Figure 6:
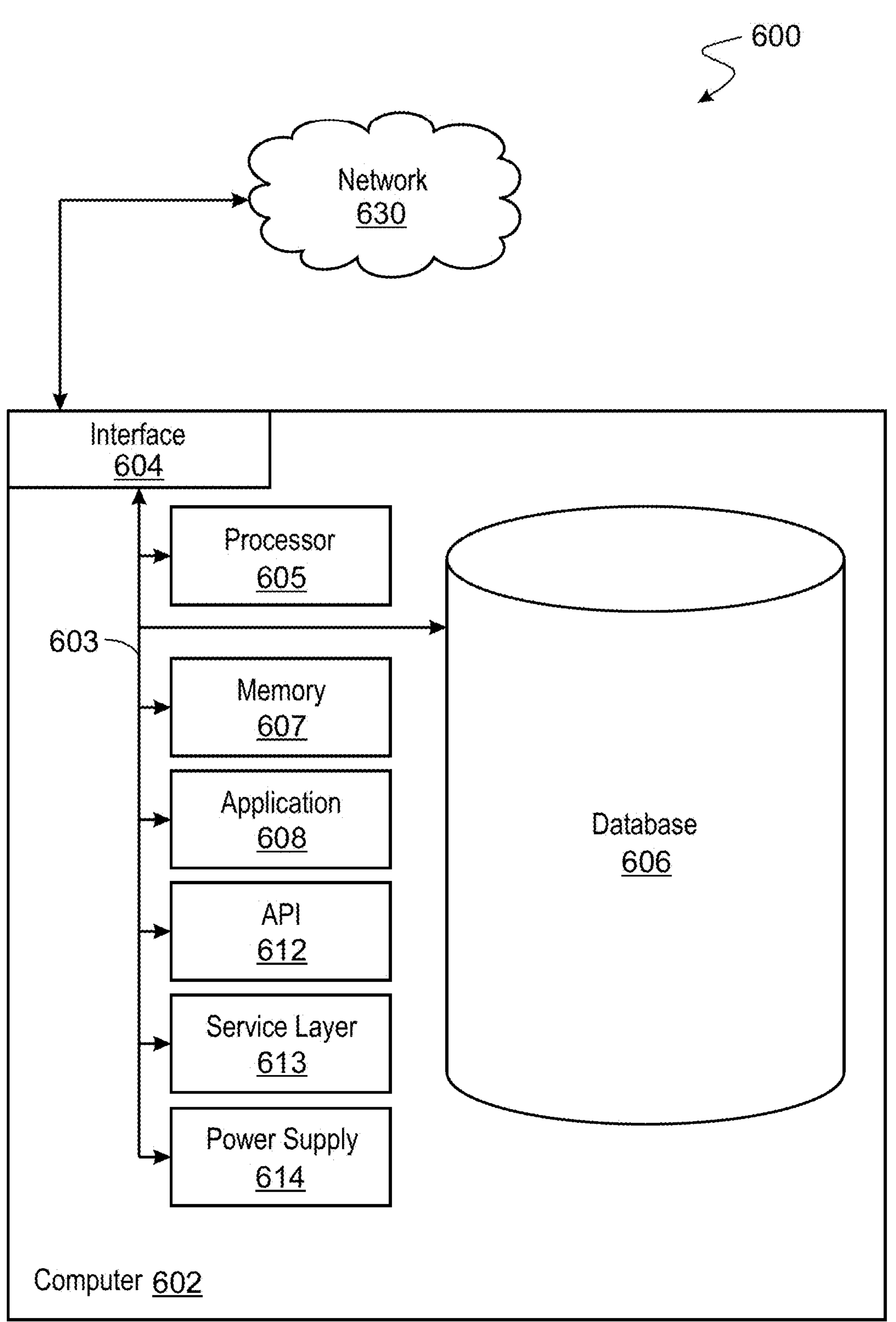
FIG. 6 is a block diagram illustrating an example computer system used to provide computational functionalities associated with described algorithms, methods, functions, processes, flows, and procedures as described in the present disclosure, according to some implementations of the present disclosure.

FIG. 6 is a block diagram of an example computer system 600 used to provide computational functionalities associated with described algorithms, methods, functions, processes, flows, and procedures described in the present disclosure, according to some implementations of the present disclosure. The illustrated computer 602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI).

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a top level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus 603. In some implementations, any or all of the components of the computer 602, including hardware or software components, can interface with each other or the interface 604 (or a combination of both) over the system bus 603. Interfaces can use an application programming interface (API) 612, a service layer 613, or a combination of the API 612 and service layer 613. The API 612 can include specifications for routines, data structures, and object classes. The API 612 can be either computer-language independent or dependent. The API 612 can refer to a complete interface, a single function, or a set of APIs.

The service layer 613 can provide software services to the computer 602 and other components (whether illustrated or not) that are communicably coupled to the computer 602. The functionality of the computer 602 can be accessible for all service consumers using this service layer. Software services, such as those provided by the service layer 613, can provide reusable, defined functionalities through a defined interface. For example, the interface can be software written in JAVA, C++, or a language providing data in extensible markup language (XML) format. While illustrated as an integrated component of the computer 602, in alternative implementations, the API 612 or the service layer 613 can be stand-alone components in relation to other components of the computer 602 and other components communicably coupled to the computer 602. Moreover, any or all parts of the API 612 or the service layer 613 can be implemented as child or sub-modules of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 also includes a database 606 that can hold data for the computer 602 and other components connected to the network 630 (whether illustrated or not). For example, database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

The application 608 can be an algorithmic software engine providing functionality according to particular needs, desires, or particular implementations of the computer 602 and the described functionality. For example, application 608 can serve as one or more components, modules, or applications. Further, although illustrated as a single application 608, the application 608 can be implemented as multiple applications 608 on the computer 602. In addition, although illustrated as internal to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power supply 614 can include a power plug to allow the computer 602 to be plugged into a wall socket or a power source to, for example, power the computer 602 or recharge a rechargeable battery.

There can be any number of computers 602 associated with, or external to, a computer system containing computer 602, with each computer 602 communicating over network 630. Further, the terms "client," "user," and other appropriate terminology can be used interchangeably, as appropriate, without departing from the scope of the present disclosure. Moreover, the present disclosure contemplates that many users can use one computer 602 and one user can use multiple computers 602.

Described implementations of the subject matter can include one or more features, alone or in combination.

For example, in a first implementation, a computer-implemented method includes the following. A cross section with visible geological fault markers for geological structures is received. An angle of inclination of a fault is measured using the cross section. An average seismic velocity to convert z-axis values from a two-way travel time to a depth is determined using the cross section, and a depth conversion is implemented. A horizontal scale and a vertical scale are compared to determine an aspect ratio of a depth section of the cross section, including determining a vertical exaggeration. The aspect ratio of the depth section is corrected for the vertical exaggeration to obtain an accurate measurement of fault inclination in the cross section. A structural style and an expected true fault inclination are determined for the depth section. An angle of obliquity and a structural trend are determined using the expected true fault inclination compared with the measured angle of inclination of the fault.

The foregoing and other described implementations can each, optionally, include one or more of the following features:

A first feature, combinable with any of the following features, where the cross section is a two-dimensional (2D) reflection seismic line.

A second feature, combinable with any of the previous or following features, where the cross section is a potentiometric field profile or seismic refraction line.

A third feature, combinable with any of the previous or following features, where determining the average seismic velocity is based on knowledge of rock types and corresponding average seismic velocities.

A fourth feature, combinable with any of the previous or following features, where determining the vertical exaggeration is based on an equation tan δ''=VE tan δ' where δ' is the inclination of a line observed on a 1:1 aspect ratio section, VE is a vertical exaggeration, and δ'' is the observed inclination on the cross section that is vertically exaggerated.

A fifth feature, combinable with any of the previous or following features, where an angle of obliquity greater than zero and less than 90° includes two possible intersections with a given cross section.

A sixth feature, combinable with any of the previous or following features, where the angle of obliquity is positive or negative with respect to the line of cross section.

In a second implementation, a non-transitory, computer-readable medium stores one or more instructions executable by a computer system to perform operations including the following. A cross section with visible geological fault markers for geological structures is received. An angle of inclination of a fault is measured using the cross section. An average seismic velocity to convert z-axis values from a two-way travel time to a depth is determined using the cross section, and a depth conversion is implemented. A horizontal scale and a vertical scale are compared to determine an aspect ratio of a depth section of the cross section, including determining a vertical exaggeration. The aspect ratio of the depth section is corrected for the vertical exaggeration to obtain an accurate measurement of fault inclination in the cross section. A structural style and an expected true fault inclination are determined for the depth section. An angle of obliquity and a structural trend are determined using the expected true fault inclination compared with the measured angle of inclination of the fault.

The foregoing and other described implementations can each, optionally, include one or more of the following features:

A first feature, combinable with any of the following features, where the cross section is a two-dimensional (2D) reflection seismic line.

A second feature, combinable with any of the previous or following features, where the cross section is a potentiometric field profile or seismic refraction line.

A third feature, combinable with any of the previous or following features, where determining the average seismic velocity is based on knowledge of rock types and corresponding average seismic velocities.

A fourth feature, combinable with any of the previous or following features, where determining the vertical exaggeration is based on an equation tan δ''=VE tan δ' where δ' is the inclination of a line observed on a 1:1 aspect ratio section, VE is a vertical exaggeration, and δ'' is the observed inclination on the cross section that is vertically exaggerated.

A fifth feature, combinable with any of the previous or following features, where an angle of obliquity greater than zero and less than 90° includes two possible intersections with a given cross section.

A sixth feature, combinable with any of the previous or following features, where the angle of obliquity is positive or negative with respect to the line of cross section.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. A cross section with visible geological fault markers for geological structures is received. An angle of inclination of a fault is measured using the cross section. An average seismic velocity to convert z-axis values from a two-way travel time to a depth is determined using the cross section, and a depth conversion is implemented. A horizontal scale and a vertical scale are compared to determine an aspect ratio of a depth section of the cross section, including determining a vertical exaggeration. The aspect ratio of the depth section is corrected for the vertical exaggeration to obtain an accurate measurement of fault inclination in the cross section. A structural style and an expected true fault inclination are determined for the depth section. An angle of obliquity and a structural trend are determined using the expected true fault inclination compared with the measured angle of inclination of the fault.

The foregoing and other described implementations can each, optionally, include one or more of the following features:

A first feature, combinable with any of the following features, where the cross section is a two-dimensional (2D) reflection seismic line.

A second feature, combinable with any of the previous or following features, where the cross section is a potentiometric field profile or seismic refraction line.

A third feature, combinable with any of the previous or following features, where determining the average seismic velocity is based on knowledge of rock types and corresponding average seismic velocities.

A fourth feature, combinable with any of the previous or following features, where determining the vertical exaggeration is based on an equation tan δ''=VE tan δ' where δ' is the inclination of a line observed on a 1:1 aspect ratio section, VE is a vertical exaggeration, and δ'' is the observed inclination on the cross section that is vertically exaggerated.

A fifth feature, combinable with any of the previous or following features, where an angle of obliquity greater than zero and less than 90° includes two possible intersections with a given cross section.

A sixth feature, combinable with any of the previous or following features, where the angle of obliquity is positive or negative with respect to the line of cross section.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at the application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:

receiving a cross section with visible geological fault markers for geological structures;

measuring, using the cross section, a fault inclination angle;

determining, using the cross section, an average seismic velocity to convert z-axis values from a two-way travel time to a depth, and implement a depth conversion;

comparing a horizontal scale and a vertical scale to determine an aspect ratio of a depth section of the cross section, comprising determining a vertical exaggeration;

correcting the aspect ratio of the depth section for the vertical exaggeration to obtain an accurate measurement of the fault inclination angle in the cross section;

determining, for the depth section, a structural style and an expected true fault inclination;

determining, using the expected true fault inclination compared with the angle of inclination of the fault, an angle of obliquity and a structural trend; and adjusting drilling operations of a well, by modifying drilling parameters of a drill bit, relative to the angle of obliquity and the structural trend.

2. The computer-implemented method of claim 1, wherein the cross section is a two-dimensional (2D) reflection seismic line.

3. The computer-implemented method of claim 1, wherein the cross section is a potentiometric field profile or seismic refraction line.

4. The computer-implemented method of claim 1, wherein determining the average seismic velocity is based on knowledge of rock types and corresponding average seismic velocities.

5. The computer-implemented method of claim 1, wherein determining the vertical exaggeration is based on an equation $\tan \delta'' = VE \tan \delta'$ where $\delta'$ is the inclination of a line observed on a 1:1 aspect ratio section, VE is a vertical exaggeration, and $\delta''$ is the fault inclination on the cross section that is vertically exaggerated.

6. The computer-implemented method of claim 1, wherein an angle of obliquity greater than zero and less than 90° includes two possible intersections with a given cross section.

7. The computer-implemented method of claim 1, wherein the angle of obliquity is positive or negative with respect to a cross section line.

8. A non-transitory, computer-readable medium storing one or more instructions executable by a computer system to perform operations comprising:

receiving a cross section with visible geological fault markers for geological structures;

measuring, using the cross section, a fault inclination angle;

determining, using the cross section, an average seismic velocity to convert z-axis values from a two-way travel time to a depth, and implement a depth conversion;

comparing a horizontal scale and a vertical scale to determine an aspect ratio of a depth section of the cross section, comprising determining a vertical exaggeration;

correcting the aspect ratio of the depth section for the vertical exaggeration to obtain an accurate measurement of the fault inclination angle in the cross section;

determining, for the depth section, a structural style and an expected true fault inclination;

determining, using the expected true fault inclination compared with the angle of inclination of the fault, an angle of obliquity and a structural trend; and adjusting drilling operations of a well, by modifying drilling parameters of a drill bit, relative to the angle of obliquity and the structural trend.

9. The non-transitory, computer-readable medium of claim 8, wherein the cross section is a two-dimensional (2D) reflection seismic line.

10. The non-transitory, computer-readable medium of claim 8, wherein the cross section is a potentiometric field profile or seismic refraction line.

11. The non-transitory, computer-readable medium of claim 8, wherein determining the average seismic velocity is based on knowledge of rock types and corresponding average seismic velocities.

12. The non-transitory, computer-readable medium of claim 8, wherein determining the vertical exaggeration is based on an equation $\tan \delta'' = VE \tan \delta'$ where $\delta'$ is the inclination of a line observed on a 1:1 aspect ratio section, VE is a vertical exaggeration, and $\delta''$ is the fault inclination on the cross section that is vertically exaggerated.

13. The non-transitory, computer-readable medium of claim 8, wherein an angle of obliquity greater than zero and less than 90° includes two possible intersections with a given cross section.

14. The non-transitory, computer-readable medium of claim 8, wherein the angle of obliquity is positive or negative with respect to a cross section line.

15. A computer-implemented system, comprising:

one or more processors; and a non-transitory computer-readable storage medium coupled to the one or more processors and storing programming instructions for execution by the one or more processors, the programming instructions instructing the one or more processors to perform operations comprising:

receiving a cross section with visible geological fault markers for geological structures;

measuring, using the cross section, a fault inclination angle;

determining, using the cross section, an average seismic velocity to convert z-axis values from a two-way travel time to a depth, and implement a depth conversion;

comparing a horizontal scale and a vertical scale to determine an aspect ratio of a depth section of the cross section, comprising determining a vertical exaggeration;

correcting the aspect ratio of the depth section for the vertical exaggeration to obtain an accurate measurement of the fault inclination angle in the cross section;

determining, for the depth section, a structural style and an expected true fault inclination;

determining, using the expected true fault inclination compared with the angle of inclination of the fault, an angle of obliquity and a structural trend; and adjusting drilling operations of a well, by modifying drilling parameters of a drill bit, relative to the angle of obliquity and the structural trend.

16. The computer-implemented system of claim 15, wherein the cross section is a two-dimensional (2D) reflection seismic line.

17. The computer-implemented system of claim 15, wherein the cross section is a potentiometric field profile or seismic refraction line.

18. The computer-implemented system of claim 15, wherein determining the average seismic velocity is based on knowledge of rock types and corresponding average seismic velocities.

19. The computer-implemented system of claim 15, wherein determining the vertical exaggeration is based on an equation $\text{tam } \delta'' = VE \tan \delta'$ where $\delta'$ is the inclination of a line observed on a 1:1 aspect ratio section, VE is a vertical exaggeration, and $\delta''$ is the fault inclination on the cross section that is vertically exaggerated.

20. The computer-implemented system of claim 15, wherein an angle of obliquity greater than zero and less than 90° includes two possible intersections with a given cross section.

* * * * *